Jan. 7, 1936. L. A. WRIGHT, JR 2,027,260
FOOT OPERATED TRANSMISSION
Filed Dec. 13, 1934   3 Sheets-Sheet 1

Inventor
Lee A. Wright, Jr.
By Clarence A. O'Brien
Attorney

Jan. 7, 1936.  L. A. WRIGHT, JR  2,027,260
FOOT OPERATED TRANSMISSION
Filed Dec. 13, 1934   3 Sheets-Sheet 2

Inventor
Lee A. Wright, Jr.

By *Clarence A. O'Brien*
Attorney

Jan. 7, 1936.  L. A. WRIGHT, JR  2,027,260
FOOT OPERATED TRANSMISSION
Filed Dec. 13, 1934  3 Sheets-Sheet 3

Inventor
Lee A. Wright, Jr.

By Clarence A. O'Brien
Attorney

Patented Jan. 7, 1936

2,027,260

UNITED STATES PATENT OFFICE 2,027,260

FOOT-OPERATED TRANSMISSION

Lee Addison Wright, Jr., Burley, Idaho

Application December 13, 1934, Serial No. 757,387

2 Claims. (Cl. 192—3.5)

This invention relates to a foot-operated transmission, the general object of the invention being to provide transmission means which is controlled entirely by one foot moving a pedal, the transmission being non-clashing and easily shifted from any speed to another speed by one function of the foot.

Another object of the invention is to provide means for actuating the clutch by vacuum from the motor, such means being controlled by the movement of the pedal.

This invention also consists in certain other features of construction and in the combination and arrangement of several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Fig 6 is a section on line 6—6 of Fig. 2 showing the reverse gearing.

Figures 2, 5:
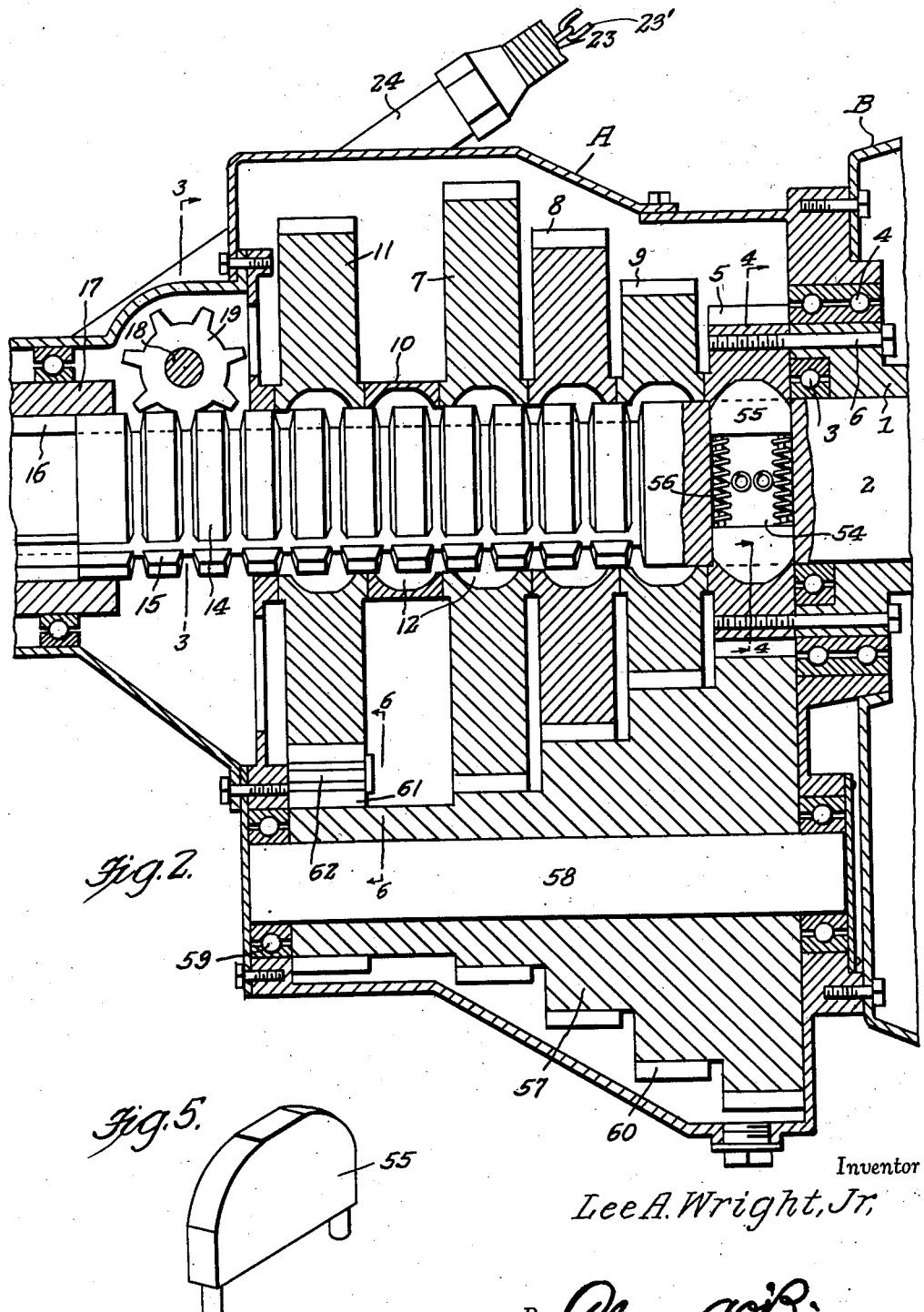
Fig. 2 is a longitudinal sectional view through the transmission means.
Fig. 5 is a view of one of the keys.
Figure 3:
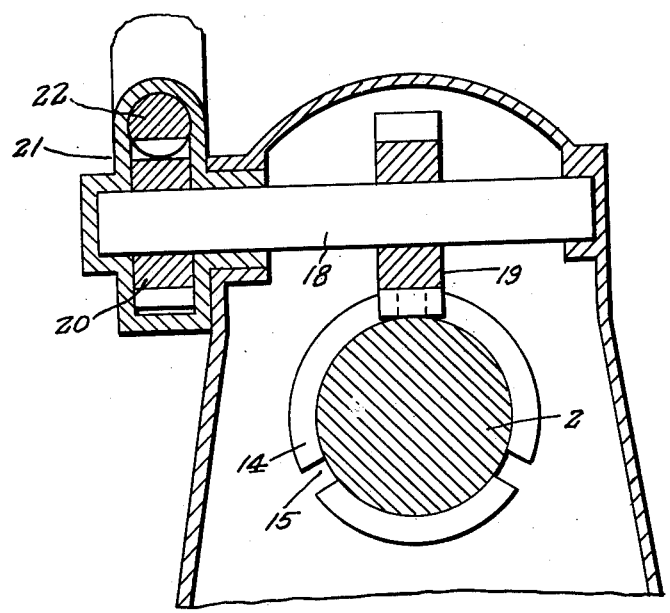
Fig. 3 is a section on line 3—3 of Fig. 2.

In these drawings, the letter A indicates the transmission housing and the letter B the clutch and fly-wheel housing. The numeral 1 indicates a portion of the drive shaft driven from the usual motor and the rear part of this shaft is hollow and slidably receives the front end of the transmission shaft 2, anti-friction bearings 3 being located between a portion of the shaft 2 and shaft 1. The rear end of the shaft 1 is enlarged and anti-friction bearings 4 are placed between the enlargement and the front end of the housing A and the high speed gear 5 of the transmission is fastened to the enlarged part of the shaft 1 by bolts 6. The first, second and third speed gears are shown at 7, 8, and 9 respectively, a neutral member is shown at 10, and the reverse gear at 11. The hubs of all of these gears and the member 10 are bored for the passage of the shaft 2 and the walls of each bore is formed with the elongated recesses 12 shown more particularly in Fig. 4 with the side walls of each recess curving outwardly towards the faces of the gear from a flat central portion as shown in Fig. 2.

A portion of the shaft 2 is formed with the annular teeth 14 which are notched as at 15 to form key-ways for the keys 16 of the driven shaft 17, the front portion of which is hollow to slidably receive the rear portion of the shaft 2.

A shaft 18 is journaled in a rear extension of the housing A and carries a gear 19 for meshing with the teeth 14 so that when the shaft 18 is turned, the gear 19 will move the shaft 2 longitudinally. A gear 20 is fastened to the shaft 18 and is located in a small casing 21 forming part of the extension of the housing A and a rack 22 meshes with this gear 20, said rack being attached to one end of a flexible shaft 23' located in a flexible casing 23 which has its ends connected to the tubular parts 24 and 25, the latter part 25 being passed through a portion of the floor 26 of the motor vehicle and a rod 27 connects the flexible shaft to a pedal 28, the rod being connected with the pedal by a universal joint or the like.

Figure 1:
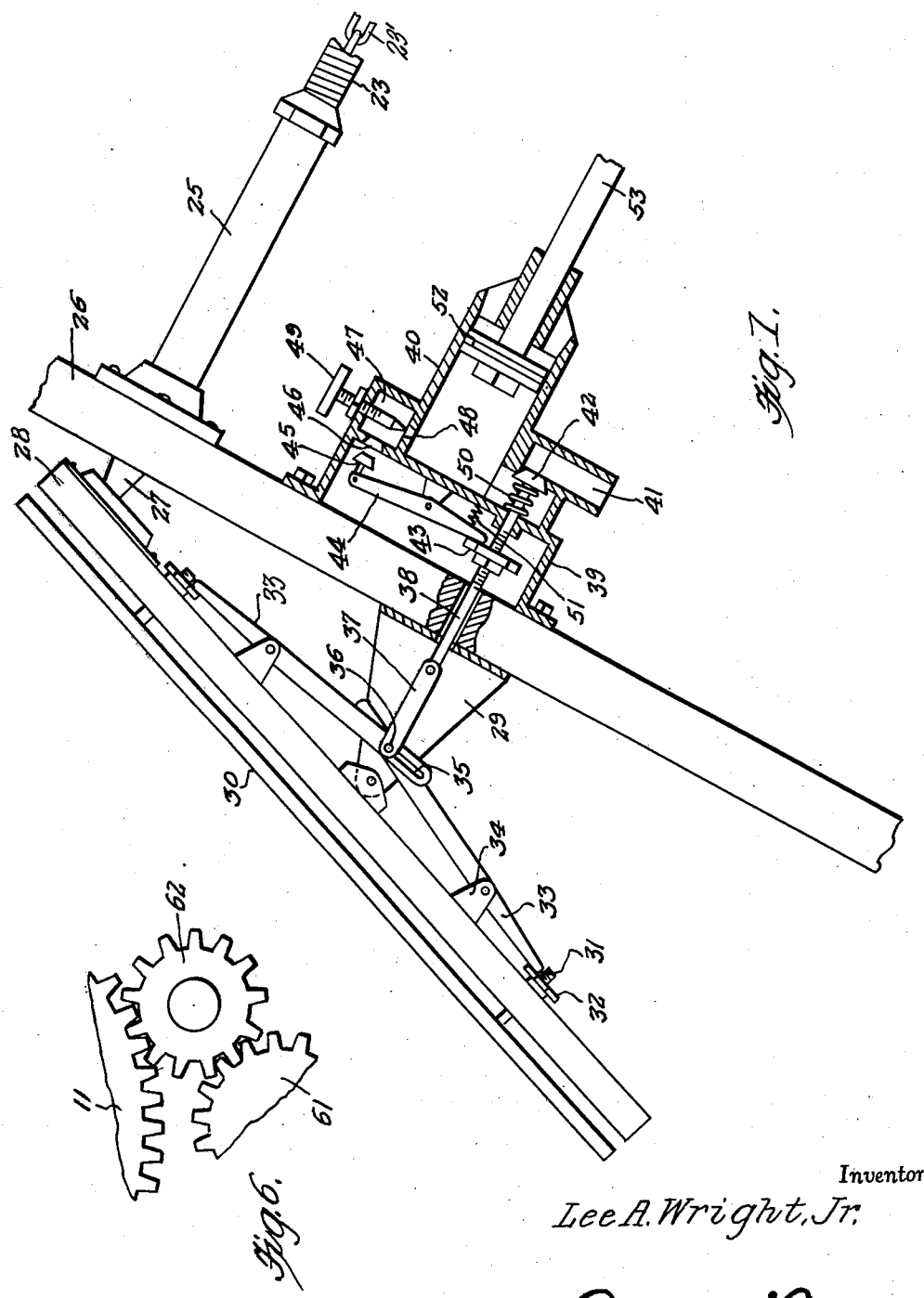
Fig 1 is an elevation with parts in section showing the automatic clutch operating means controlled from the pedal and the manner of supporting the pedal from a part of the floor of a vehicle and the means attached to the pedal for operating the transmission.

The pedal 28 is pivoted to a bracket 29 attached to the floor 26 and carries a smaller pedal 30 which has bolts 31 attached thereto and passing through holes in the pedal 28 with nuts 32 on the inner ends of the bolts for engaging the levers 33 pivoted to the brackets 34 attached to the underface of the pedal 28. Thus, when the foot is placed on the pedal 30 and depressed, the pedal 30 first moves towards the pedal 28 and rocks the levers 33, the inner ends of which are slotted as at 35 for receiving a pin 36 passing through links 37, the front ends of which are pivoted to a rod 38 which passes through a hole in the floor and through a casing 39 attached to the front face of the floor 26. A cylinder 40 is formed with the casing and the rear end of the cylinder communicates with a tubular part 41 which is adapted to be connected in any suitable manner with a suction part of the motor of the vehicle. A valve 42 controls communication between the cylinder and the tubular part 41 and is attached to the front end of the rod 38, a portion of the rod being threaded for receiving a nut 43 which operates a lever 44 pivoted in the casing 39 and carrying a valve 45 which controls a port 46 leading into a small chamber 47 in the casing and which is in communication with the cylinder through a port 48 controlled by a needle valve 49. A spring 50 is located on the front end of the rod 38 between the valve 22 and a part of the casing and tends to hold the valve 42 closed and the pedals in the position shown in Fig. 1 which is the high speed position. A spring 51 tends to hold the lever 44 in a position against the nut 43 and the valve 45 closing the port 46. A piston 52 is located in the cylinder 40 and a rod 53 connects the piston to the clutch of the vehicle.

Thus by the first movement of the pedal 30, the levers 33 open the valve 42 so as to connect the cylinder with the inlet manifold or other suction producing part of the motor so that the suction or vacuum will move the piston 52 rearwardly and thus releases the clutch. As will be seen, this movement also causes the lever 44 to close the valve 45 but when the parts are in the position shown in Fig. 1, the valve 42 is closed thus closing communication between the cylinder and the manifold and opening the ports 46 so that the vacuum in the cylinder 40 is broken and then the clutch spring pulls the piston back to its proper position. The speed at which the clutch engages is controlled by the needle valve 49.

After this initial movement of the pedal 30, further pressure will operate the pedal 28 so as to cause the flexible shaft to move the rack 22 to partly rotate the shaft 18 and thus cause the gear 19 to move the shaft 2 longitudinally through the meshing of the gear 19 with its teeth 14 of the shaft 2.

Said shaft 2 is provided with the intersecting slots 54, in each end of each of which is slidably arranged a key or dog 55 which has the corners of its outer end rounded as shown in Fig. 5 with the central part of said end flat so that this end of the key or dog conforms to the shape of a recess 12 in each gear and in the member 10. Springs 56 located in the slots 54 project the keys and as will be seen the peculiar shape of the recesses 12 and of the keys will cause the keys to move inwardly against the action of the springs when the shaft 2 is moved longitudinally to cause the keys to move out of the recesses of one gear into the recesses of another gear, the springs 56 projecting the keys into the recesses of said other gear as soon as the keys come into registry with said recesses.

A substantially conical gear 57 is arranged on a countershaft 58 in the lower part of the housing A, the shaft being provided with the antifriction bearings 59, the gear 57 being provided with the stepped gears 60 arranged in annular rows, one row meshing with each of the gears 5, 7, 8, and 9 and said countergear 57 carries another row of teeth shown at 61 which mesh with an idle gear 62 which in turn meshes with the reverse gear 11 as shown more particularly in Fig. 6.

As will be seen in Fig. 2, when the shaft 2 is in the position shown in said figure, the vehicle will be driven at high speed, and when the shaft 2 has been moved longitudinally to place the keys 55 in engagement with the recesses of the member 10 which is not provided with teeth, the parts will be in neutral. Then by moving the shaft 2 forwardly to place the keys in the recesses of the gear 7, the vehicle will be driven at the first speed, and when the keys are in engagement with the recesses of the gear 8, the vehicle will be in second speed, and when the keys are in engagement with the recesses of the gear 9, the vehicle will be in third speed. Of course, by moving the shaft 2 rearwardly to place the keys in engagement with the recesses of the gear 11, the vehicle will be in reverse. It will also be seen in Fig. 2 that the gear 57 is driven at all times from the drive shaft 1 and this gear 57 transmits the speed of the shaft 1 to any of the intermediate gears or the reverse gear though these gears will not transmit speed to the shaft 2 and the driven shaft 17 until the shaft 2 has been moved to a position where the keys 55 will engage the recesses of said gear.

Figure 4:
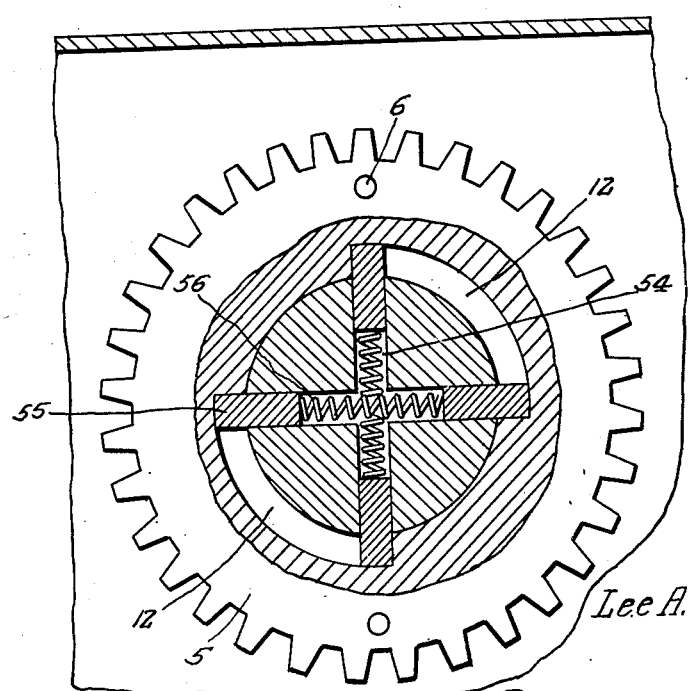
Fig. 4 is a section on line 4—4 of Fig. 2.

As will be seen, one foot of the operator actuates the transmission and releases the clutch and if it is desired to shift two or three gears, it is only necessary to continue the pressure on the pedals and as each gear is passed, the pedals will jerk which is caused by the keys fitting into the slots or recesses and the extra pressure on the pedals to force the keys into the next slots or recesses. As shown in Fig. 4, the slots or recesses 12 are made long enough that two keys will just fit one slot. This will enable the keys to have plenty of time to fit into the slots or recesses 12 even though the shaft and the gears are usually turning at different rates of speed. When the keys are in position to fit into the recesses 12, two of the keys will always be projected into the slots or recesses and engaging the gear and the other two keys will have plenty of time to fit into the recesses and prevent play between the gear and the shaft.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:

1. In a device of the class described, a drive shaft, a clutch for connecting the shaft to a motor, a driven shaft, a longitudinally movable shaft located between the two shafts, gears rotatably arranged on the longitudinally movable shaft, a countermember having gear teeth meshing with the gears, means for connecting one of the gears to the drive shaft, spring actuated keys carried by the longitudinally movable shaft and the gears having recesses therein for receiving the keys for connecting the gears to the longitudinally movable shaft, pedal means, means actuated thereby for moving the longitudinally movable shaft, vacuum controlled means for actuating the clutch, control means for the last mentioned means and pedal means for operating the control means.

2. In a motor vehicle including a drive shaft, and a clutch for connecting the shaft to the motor, a second shaft having one end slidably supported by the drive shaft, a driven shaft in which the second shaft has sliding but non-rotatable movement, a plurality of gears and a neutral member rotatably arranged on the second shaft, one of the gears being connected with the drive shaft, each gear and the neutral member having recesses therein, spring-actuated keys carried by the second shaft for engaging the recesses, a countermember having annular rows of teeth thereon meshing with the gears, means for rotatably supporting the same, a foot pedal means actuated thereby for moving the second shaft longitudinally, a cylinder, means connecting the same with a suction producing part of the motor of the vehicle, a valve for controlling communication between the cylinder and said part, a member movably supported by the pedal and imparting movement to the pedal after said member has been moved to a certain extent, means for opening the valve upon movement of the said member, a piston connected with the clutch, spring means for closing the valve, means for venting the cylinder upon closing of the valve, and manually operated means for regulating the venting action.

LEE A. WRIGHT, JR.